United States Patent
Harwood

(10) Patent No.: US 6,916,985 B1
(45) Date of Patent: Jul. 12, 2005

(54) LOCKING SYSTEM FOR AN ELECTRONIC ENCLOSURE

(75) Inventor: Walter Harwood, Streamwood, IL (US)

(73) Assignee: Charles Industries, Ltd., Rolling Meadows, IL (US)

( * ) Notice: Subject to any disclaimer, the term of this patent is extended or adjusted under 35 U.S.C. 154(b) by 0 days.

(21) Appl. No.: 10/797,392

(22) Filed: Mar. 10, 2004

(51) Int. Cl.[7] .................................................. H02G 9/00
(52) U.S. Cl. ............................ 174/38; 174/39; 174/37; 220/4.02
(58) Field of Search .......................... 174/38, 39, 17 R, 174/17 CT, 58, 68.3, 101, 37; 220/4.02, 475, 3.8; 361/145; 52/23

(56) References Cited

U.S. PATENT DOCUMENTS

| | | | | | |
|---|---|---|---|---|---|
| 3,872,234 | A | * | 3/1975 | Smith ........................... | 174/38 |
| 3,928,713 | A | * | 12/1975 | Davis ........................... | 174/38 |
| 4,190,734 | A | * | 2/1980 | Dressler, Jr. .................. | 174/38 |
| 4,951,182 | A | * | 8/1990 | Simonson et al. ........... | 362/145 |
| 5,184,279 | A | * | 2/1993 | Horn ............................ | 361/641 |
| 5,384,427 | A | * | 1/1995 | Volk et al. .................... | 174/38 |
| 5,401,902 | A | * | 3/1995 | Middlebrook et al. ....... | 174/38 |
| D430,849 | S | | 9/2000 | Leschinger et al. | |
| D436,101 | S | | 1/2001 | McGovern et al. | |
| 6,182,846 | B1 | | 2/2001 | Leschinger et al. | |
| 6,198,041 | B1 | | 3/2001 | Leschinger et al. | |
| 6,244,635 | B1 | | 6/2001 | Leschinger et al. | |
| 6,252,166 | B1 | | 6/2001 | Leschinger | |
| 6,455,772 | B1 | | 9/2002 | Leschinger et al. | |
| 6,462,269 | B1 | * | 10/2002 | Leschinger et al. ........... | 174/38 |
| 6,598,949 | B2 | | 7/2003 | Frazier et al. | |
| 2002/0096346 | A1 | | 7/2002 | Maloney et al. | |

OTHER PUBLICATIONS

Marconi Network Components: ProFORM® Series Non-Metallic Pedestals product specification, Sep. 2003.

* cited by examiner

Primary Examiner—Dhiru R. Patel
(74) Attorney, Agent, or Firm—Leydig, Voit & Mayer, Ltd

(57) ABSTRACT

A pedestal enclosure for electronic components is provided. The pedestal enclosure includes a base section and a cover engageable with the base section. A lock mechanism is arranged on the cover. The lock mechanism includes a latch supported in a lock housing for movement between locked and unlocked positions and a rotator rotatably supported by the lock housing such that rotation of the rotator moves the latch between the locked and unlocked positions. The rotator extends through the lock housing and has a head arranged outside a first side of the housing and a shaft end arranged outside a second side of the lock housing. A removable retaining device is arranged on the shaft end outside the second side of the lock housing. A lock receptacle is supported by the base section for receiving the lock mechanism when the cover is engaged with the base section. The lock receptacle includes a catch that engages the latch when the latch is in the locked position and prevents disengagement of the cover from the base section. The lock receptacle defines a pocket including surfaces for supporting the front, rear and opposing lateral sides and the lower edge of the lock housing.

26 Claims, 10 Drawing Sheets

LOCKING SYSTEM FOR AN ELECTRONIC ENCLOSURE

FIELD OF THE INVENTION

This invention pertains to electronic enclosures and, more particular, to a locking system for an electronics enclosure.

BACKGROUND OF THE INVENTION

Pedestal style electronics enclosures are used in telecommunications systems to house splices or terminal connections between service wires or distribution wires and buried telephone cables. Such pedestal enclosures can also be used to house connections to other types of buried utility cables such as for cable television or power distribution. A bracket system is generally provided on the interior of a pedestal enclosure to help arrange and support the cabling and various connections housed in the pedestal enclosure. Since pedestal enclosures are located outdoors, they must be substantially weather tight in order to protect the electronic connections from adverse environmental conditions such as wind, rain, snow and flooding. The pedestal enclosures also have to be relatively secure in order to guard against entry by unauthorized personnel and durable in order to withstand the wear-and-tear associated with being located in an outdoor environment.

Typically, pedestal enclosures include a base section and a cover that are secured together with a fastening or locking system. Unfortunately, existing fastening and locking systems have a number of drawbacks. For example, one existing fastening system utilizes a screw with a cup-washer that threads into a metal insert that is pressed into the top of the base section and a pair of press-in studs that are also provided on the top of the base section. The cover includes three corresponding L-shaped slots for engaging the screw and the two studs. A secondary flap latch is also provided to provide additional protection in the event of a flood. The flap latch is secured to the outer surface of the cover over one of the L-shaped slots. The flap latch includes a slot that engages one of the studs in the base section when the flap latch is closed. To fasten the cover to the base section, the cover is placed on the base section, the flap latch is closed over one of the studs, and the cover is rotated to fully engage the studs and the screw in the corresponding slots. The screw is then tightened down.

With this fastening system, it is cumbersome to disengage the cover from the base section because the screw must be loosened, the cover rotated, and the flap latch flexed outward over the stud while the cover is lifted. Additionally, a technician occasionally will overextend the flap latch causing it to be permanently damaged or get his finger pinched between the flap latch and the stud. Technicians also frequently forget to tighten down the screw leaving the enclosure completely unsecured. Technicians working on pedestal enclosures typically will have a tool matching the head style on the screw of the locking system. Occasionally, these heads will become worn or break requiring replacement. There also could be other reasons to change the screw to one having a different head style such as when the enclosure will be switched over for use in a different application (e.g., from telecommunications to cable television). However, with this type of fastening system it is impractical to change the screw once the pedestal enclosure is installed in the field as it requires cutting and grinding away of the old screw and swaging the new screw in place.

Another similar fastening system also utilizes a screw with cup washer that threads into a metal insert attached to the top of the base section. However, instead of studs and a flap latch, this fastening system incorporates a plastic button attached to a flexible member molded into the top of the base section. To secure the cover to the base section, the cover is lowered onto the base so that the screw engages a complementary slot in the cover and the button snaps into a complementary hole in the cover. The screw is then tightened. To remove the cover, the screw is loosened and the button is depressed through the hole. The cover is also cumbersome to remove with this system and pushing the button a sufficient distance through the hole in the cover can be quite difficult and awkward, and even somewhat painful. Moreover, the security of the enclosure depends entirely on the screw being properly tightened by the technician. It is also impractical to change the screw to one having a different head style for the same reasons described above.

There are other locking systems that utilize quarter-turn locks located in the cover. Some of these quarter-turn locks are arranged at the bottom of the cover and engage a receiver molded into the top of the base section. Other quarter-turn locks are arranged at the top of the cover and engage a receiver supported on some internal structure in the pedestal. With both types of quarter-turn locks, the lock automatically engages the receiver when the cover is placed over the base section thereby securing the cover to the base. To remove the cover, the lock is turned approximately 90° using the appropriate tool and the cover lifted off the base section. These quarter-turn locks have plastic rotators that can be damaged during use. The rotators for the locks also cannot be changed once the lock has been installed onto the cover. In addition, the rotators are very difficult to change before the lock is installed. This makes it difficult to switch over the cover from one application to another that requires a different head style on the rotator once the manufacturing process has started.

BRIEF SUMMARY OF THE INVENTION

The invention provides a pedestal enclosure for electronic components. The pedestal enclosure includes a base section and a cover engageable with the base section. A lock mechanism is arranged on the cover. The lock mechanism includes a latch supported in a lock housing for movement between locked and unlocked positions and a rotator rotatably supported by the lock housing such that rotation of the rotator moves the latch between the locked and unlocked positions. The rotator extends through the lock housing and has a head arranged outside a first side of the housing and a shaft end arranged outside a second side of the lock housing. A removable retaining device is arranged on the shaft end outside the second side of the lock housing. A lock receptacle is supported by the base section for receiving the lock mechanism when the cover is engaged with the base section. The lock receptacle includes a catch that engages the latch when the latch is in the locked position and prevents disengagement of the cover from the base section. The lock receptacle defines a pocket including surfaces for supporting the front, rear and opposing lateral sides and the lower edge of the lock housing.

The invention also provides a locking system for a securing a base section and a cover of a pedestal enclosure. The locking system includes a lock mechanism arranged on the cover and a lock receptacle supported by the base section for receiving the lock mechanism when the cover is engaged with the base section. The lock mechanism includes a latch supported in a lock housing for movement between locked and unlocked positions and a rotator rotatably supported by the lock housing such that rotation of the rotator moves the latch between the locked and unlocked positions. The rotator extends through the lock housing and has a head arranged outside a first side of the housing and a shaft end arranged outside a second side of the lock housing. A removable retaining device is arranged on the shaft end outside the second side of the lock housing. The lock receptacle includes a catch that engages the latch when the latch is in the locked position and prevents disengagement of the cover from the base section. The lock receptacle defines a pocket including surfaces for supporting the front, rear and opposing lateral sides and the lower edge of the lock housing.

DETAILED DESCRIPTION OF THE INVENTION

Figure 1:
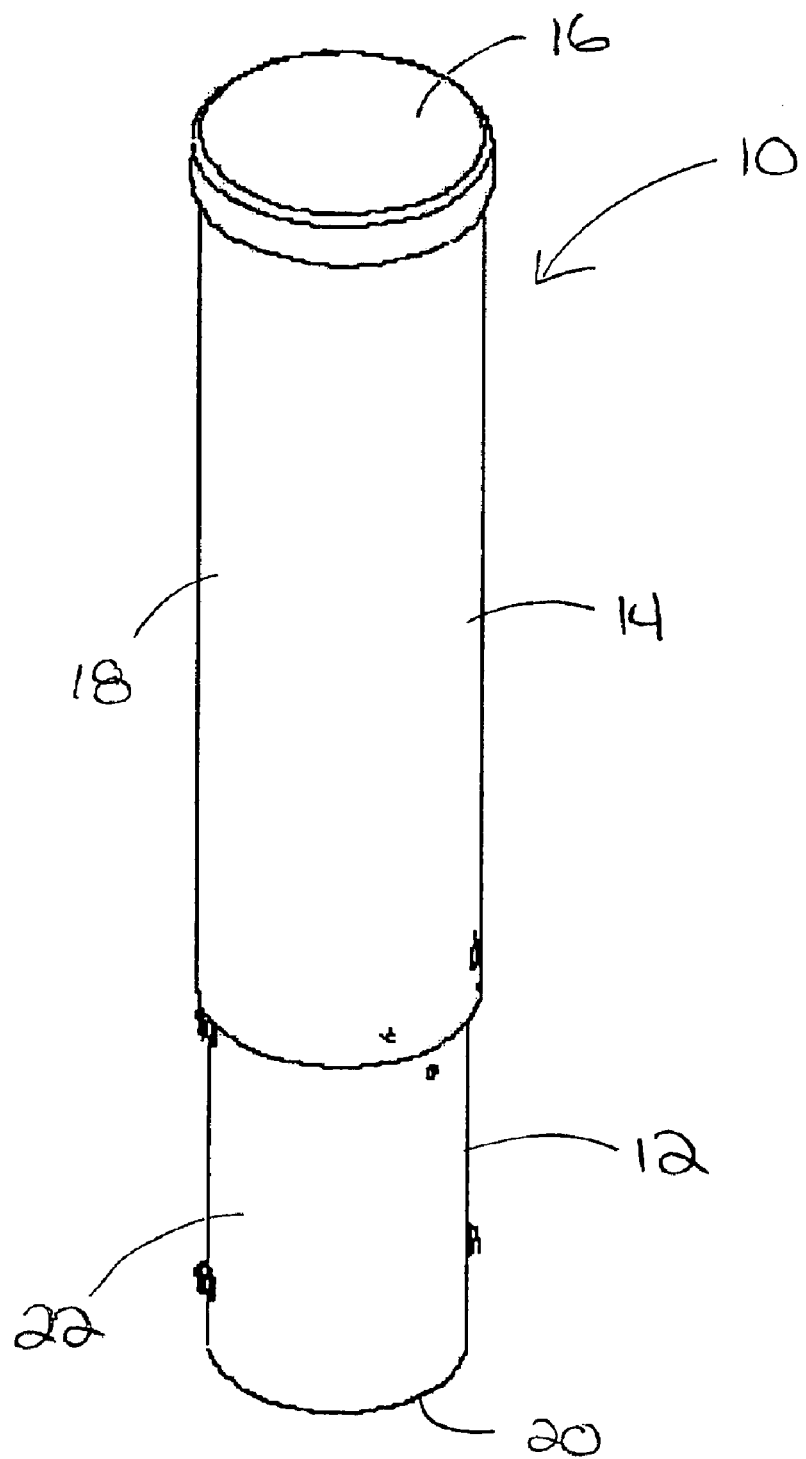
FIG. 1 is a perspective view of an illustrative pedestal enclosure.
Figure 2:
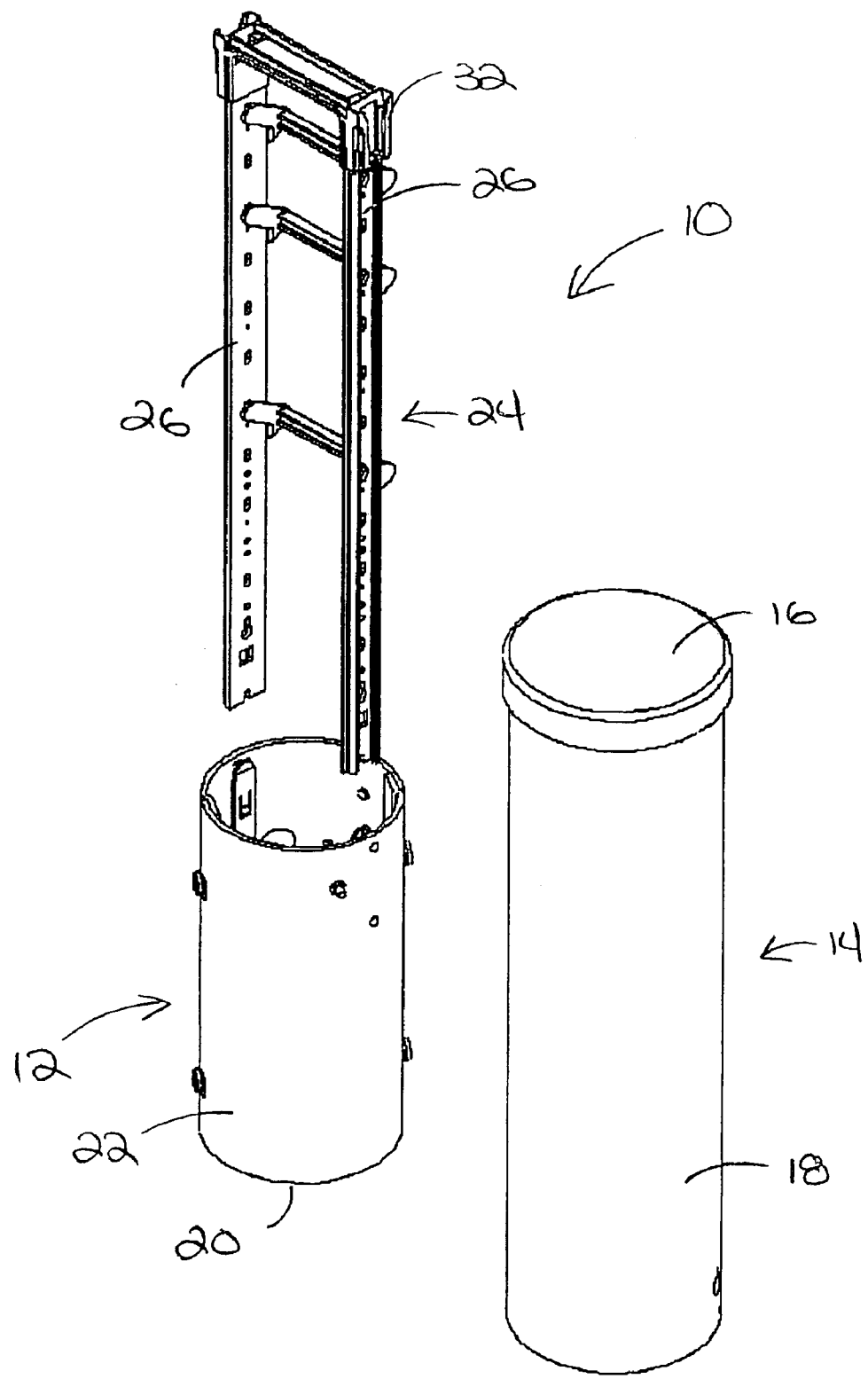
FIG. 2 is an exploded perspective view of the pedestal enclosure of FIG. 1.

Referring now to FIGS. 1 and 2 of the drawings, there is illustrated an exemplary pedestal enclosure 10 constructed in accordance with the teachings of the present invention. The illustrated pedestal enclosure 10 includes a base section 12 and a cover or dome 14. The cover 14 nests in a telescoping fashion over the base section 12 so as to define an interior space within the pedestal enclosure 10. This interior space can be used to house electronic equipment such as used in telecommunications, cable television or power transmission applications. The illustrated pedestal enclosure 10 is cylindrical in shape with both the cover 14 and the base section 12 including a respective end wall 16, 20 and a respective sidewall 18, 22. As will be appreciated by those skilled in the art, the present invention is not limited to any particular pedestal enclosure size or configuration. Moreover, while the present invention is discussed in the context of telecommunication systems, the present invention is not limited to a pedestal enclosure for housing any particular type of electronic component.

When in use, at least a portion of the base section 12 is typically filled with dirt and/or gravel and buried in the ground. Underground cables can be fed into the interior space of the pedestal enclosure 10 through an opening in the base section 12. To support the cabling, connections or other electronics housed in the pedestal enclosure 10, a bracket system 24 is provided. The bracket system generally includes a pair of side rails 26 that are mounted to the base section 12. A bracket system of any desired configuration can be used including, for example, internal splice bracket systems, universal backboard bracket systems and bracket systems having a wire or fiber splice closure.

To secure the cover 14 to the base section 12, the illustrated pedestal enclosure 10 includes a locking system 28. As compared with prior art locking systems, the locking system 28 of the present invention is much more flexible with respect to where it can be installed on the pedestal enclosure 10. Moreover, the locking system 28 is much easier to modify to accept differently configured keys or opening tools as well as otherwise repair in the field. The lock system 28 is also robust and sturdy providing superior protection against unauthorized forced entry. To this end, the locking system 28 generally includes a lock mechanism 30 supported on the cover 14 and a lock receptacle 32 supported directly or indirectly on the base section 12.

Figure 3:
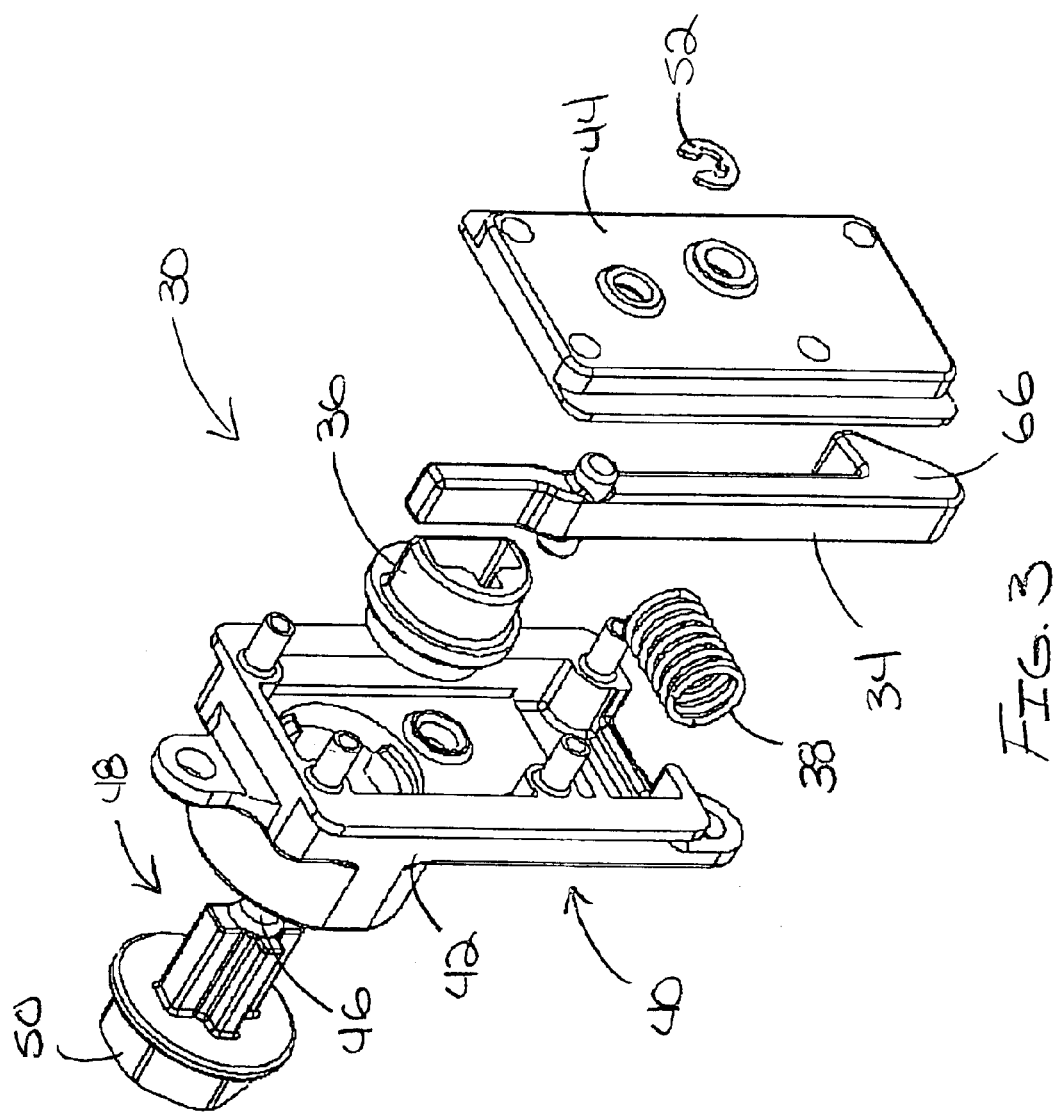
FIG. 3 is an exploded rear perspective view of an exemplary lock mechanism according to the present invention for the pedestal enclosure of FIG. 1.

Referring to FIG. 3 of the drawings, the illustrated lock mechanism 30 includes a latch 34, cam 36 and compression spring 38 arranged within a housing 40 that, in this case, consists of front and rear housing parts 42, 44. In particular, the latch 34 is pivotably supported in the housing 40 for movement between locked and unlocked positions. The compression spring 38 is arranged in the housing 40 so as to bias the latch 34 towards the locked position. Thus, any movement of the latch 34 to the unlocked position is counter to the force applied by the spring 38. To control movement of the latch 34 between the locked and unlocked positions, the cam 36 is supported on the shaft 46 of a rotator 48. The cam 36 is arranged relative to the latch 34 such that rotation of the cam 36 moves the latch 34 between the locked and unlocked positions. The rotator 48 is rotatably supported on the housing 40 and includes a head 50 arranged outside the front part 42 of the housing. The rotator shaft 46 and, in turn, the cam 36 can be rotated by engaging the rotator head 50 with a tool adapted to mate with the particular head design. To make the lock mechanism 30 more durable and secure, the lock mechanism components preferably are made of metal. However, non-metal components can also be used.

Figure 4:
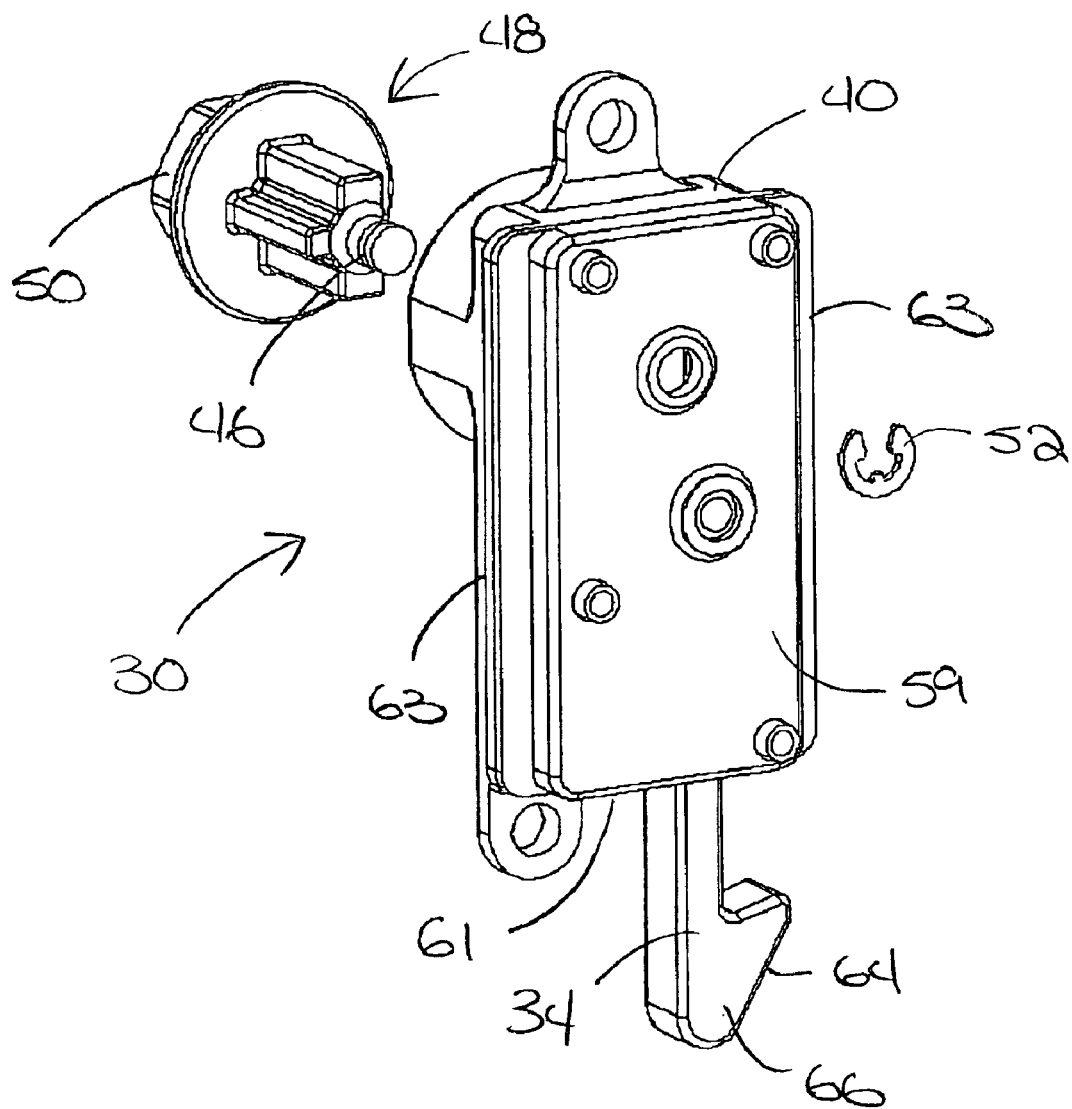
FIG. 4 is a rear perspective view of the lock mechanism of FIG. 3 showing the lock rotator exploded from the lock mechanism.

Advantageously, the rotator 48 is connected to the housing 40 in such a way that the rotator 48 can be easily removed and replaced without disassembling the lock mechanism housing 40. Specifically, in the illustrated embodiment, the rotator shaft 46 extends completely through the housing 40 and out the rear housing part 44. A manually removable or releasable retaining device, in this case a snap ring 52, engages the portion of the rotator shaft 46 that protrudes out the rear housing part 44 securing the rotator 48 to the housing 40 (see FIGS. 3 and 4). Because the retaining ring 52 is located outside the housing 40, it is easily accessible in the event that the rotator 48 needs to be removed and replaced in the field such as if the rotator head 50 is damaged or a change to a different rotator head style is desired. Any suitable removable retaining device can be used on the portion of the rotator shaft outside of the lock housing (e.g., snap rings, pins, threaded fasteners, snap-on fasteners, etc.) provided that the retaining device is capable of retaining, fastening or securing the rotator to the housing and is capable of being removed to release the rotator from the housing.

Figure 12:
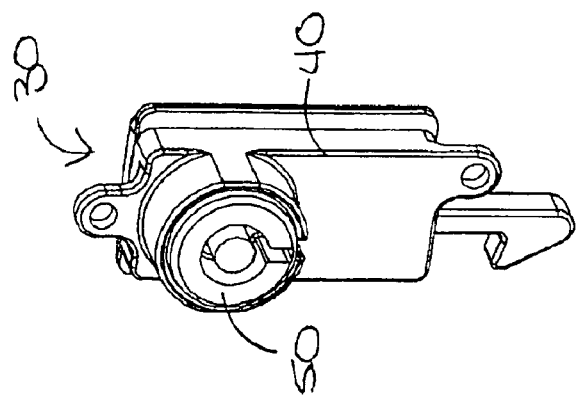
FIGS. 10–12 are perspective views of lock mechanisms according to the present invention each having a differently configured lock rotator head.
Figure 11:
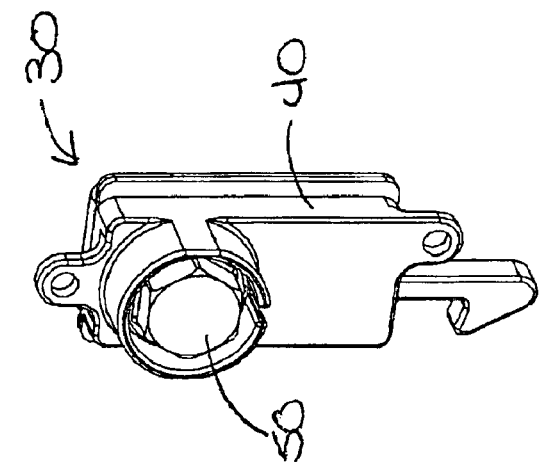
Figure 10:
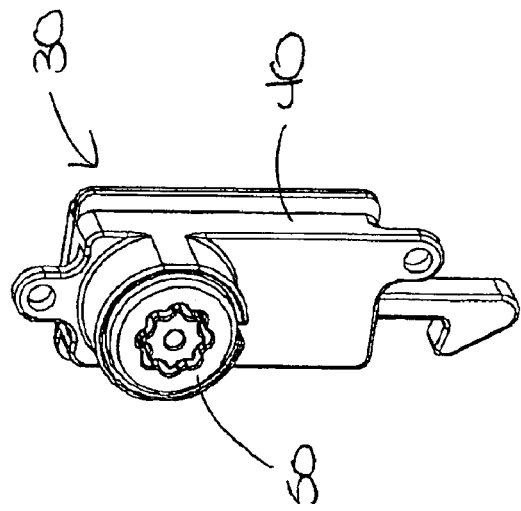

To remove the rotator 48, the retaining ring 52 is disengaged from the shaft 46 and the rotator 48 pulled out of the housing 40 through an opening in the front housing part 42. The new rotator 48 can then be slid through the housing 40 through the front housing part 42 and secured in place by engaging the same or a new retaining ring 52 on the end of the shaft 46 protruding through the rear housing part 44. The removal and replacement of the rotator 48 can be done with the lock mechanism 30 still installed on the cover 14 as the retaining ring 52 is accessible from the inside of the cover. As can be seen from FIGS. 10–12, rotators 48 having a variety of different head 50 configurations can be used with the lock mechanism 30 of the present invention including, for example, a deep star head (FIG. 10), a hex head (FIG. 11) and a keyed head (FIG. 12). It will be understood that the present invention is not limited to any particular rotator head configuration.

Figure 5:
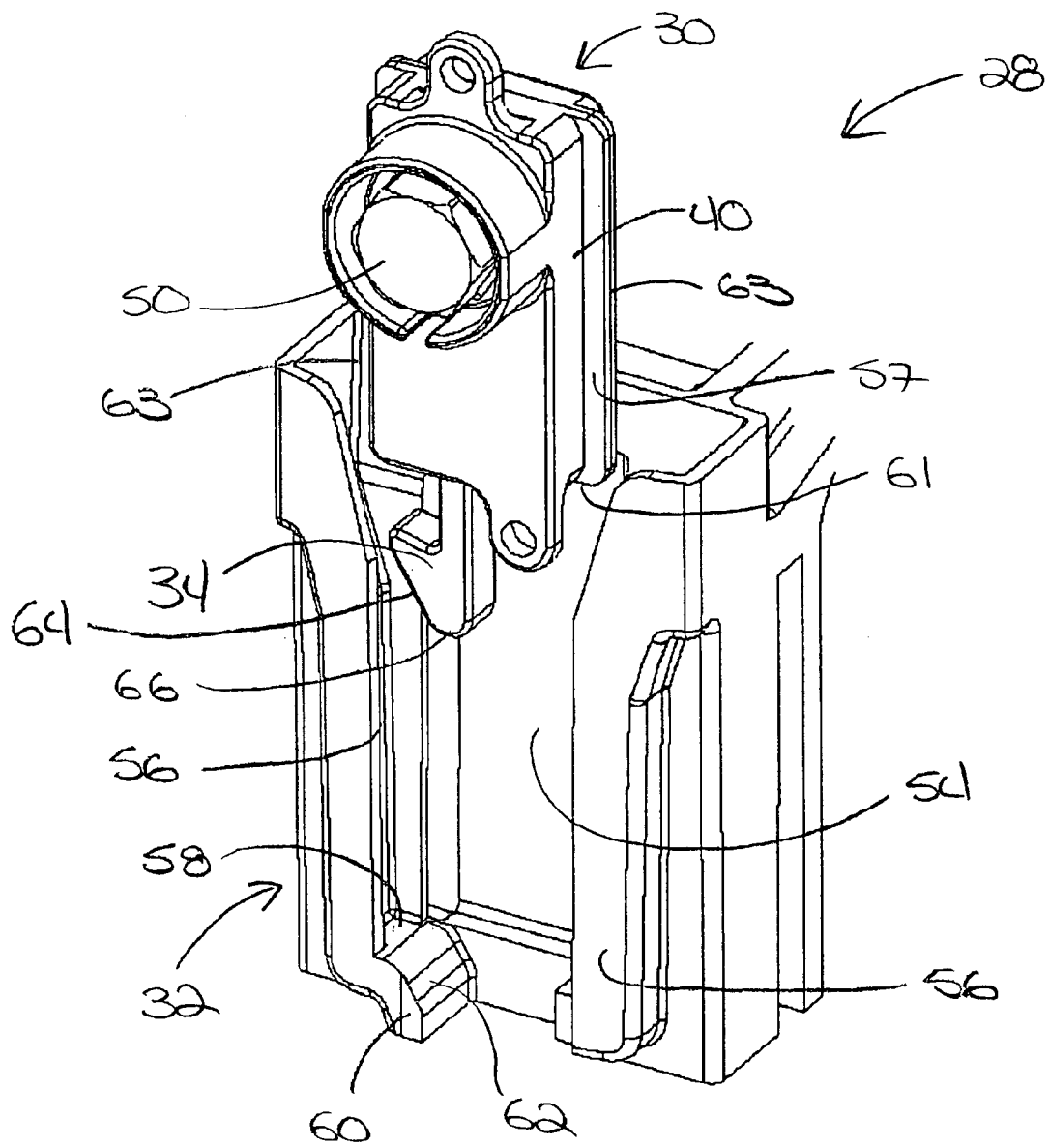
FIG. 5 is a front perspective view of the lock mechanism of FIG. 3 and a mating lock receptacle.
Figure 6:
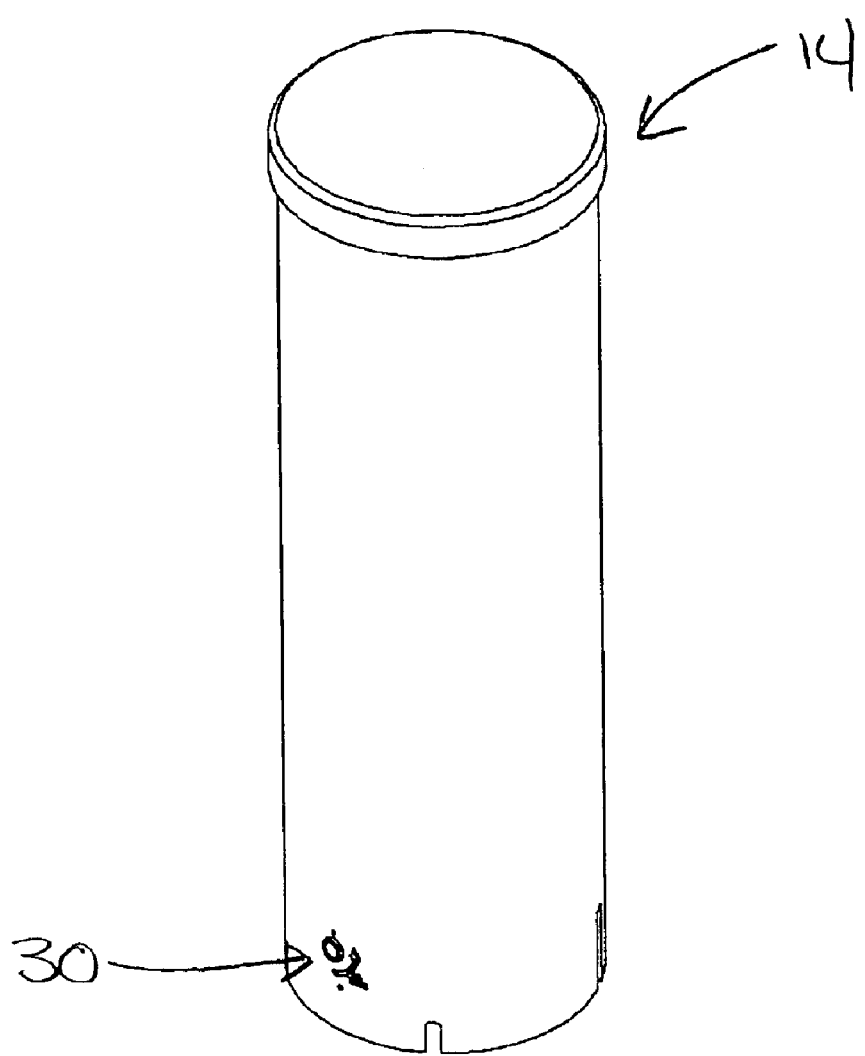
FIG. 6 is a perspective view of a cover for a pedestal enclosure having a lock mechanism according to the invention arranged near the lower edge of the cover.
Figure 7:
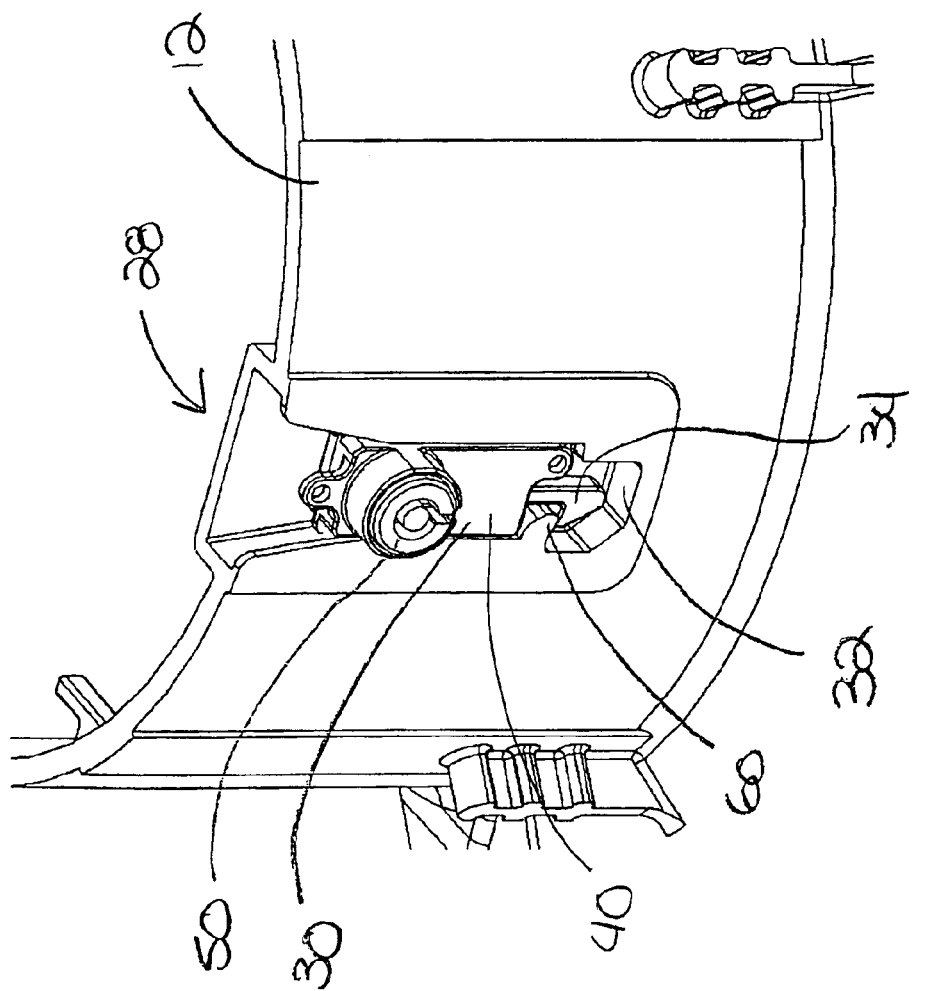
FIG. 7 is a partial perspective view of a base section for use with the cover of FIG. 6 showing a lock mechanism and mating receptacle according to the present invention.

The lock receptacle 32 is adapted and arranged to capture and engage the lock mechanism 30. In the embodiment illustrated in FIGS. 6 and 7, the lock mechanism 30 is arranged near the bottom of the cover 14. The lock receptacle 32, in turn, is arranged at the upper edge of the base section 12 (see FIG. 7). As shown in FIG. 7, the lock receptacle 32 is configured to define a pocket into which the lock mechanism 30 is lowered when the cover 14 is placed on the base section 12. The pocket defined by the lock receptacle 32 supports the lock mechanism 30 on its front 57, rear 59, bottom 61 and two lateral sides 63 (see FIGS. 4 and 5). This support gives the locking system a more rugged construction that is resistant to forced entry and other impact loads as well as normal wear. In this case, the lock receptacle 32 includes a back wall 54 and two opposing side rails 56 that define three-sided channels for receiving the sides of the lock mechanism housing 40 (and for also supporting the front and rear sides of the lock housing). Moreover, an end wall 58 is provided at the lower end of each of the side rails 56 for engaging the lower end of the lock mechanism housing 40 (one end wall 58 can be seen in FIG. 5).

For engaging the lock mechanism latch 34, a catch 60 is provided at the lower end of the lock receptacle 32. The catch 60 has a tapered side surface 62 that engages a complementary tapered side surface 64 of a hook 66 at the lower end of the latch 34 when the lock mechanism 30 is lowered into the lock receptacle 32. The engagement of the tapered side surfaces 62, 64 on the catch 60 and the hook 66 as the lock mechanism 30 is lowered produces a camming action that pushes the latch 34 against the force of the compression spring 38 towards the unlocked position. This allows the latch hook 66 to move past the catch 60. Once the latch hook 66 clears the catch 60, the compression spring 38 pushes the latch 34 back into the locked position thereby preventing the lock mechanism 30, and in turn the cover 14, from moving back upward relative to the lock receptacle 32, and in turn the base 12. To unlock the cover 14 from the base 12, the rotator head 50 is engaged with a tool that can be used to turn the rotator 48 causing the cam 36 to pivot the latch 34 to the unlocked position. In the illustrated embodiment, a one-quarter turn of the rotator 48 will move the latch to the unlocked position. Once the latch 34 is in the unlocked position, the lock mechanism 30 can move upward relative to the lock receptacle 32 past the catch 60.

Figure 8:
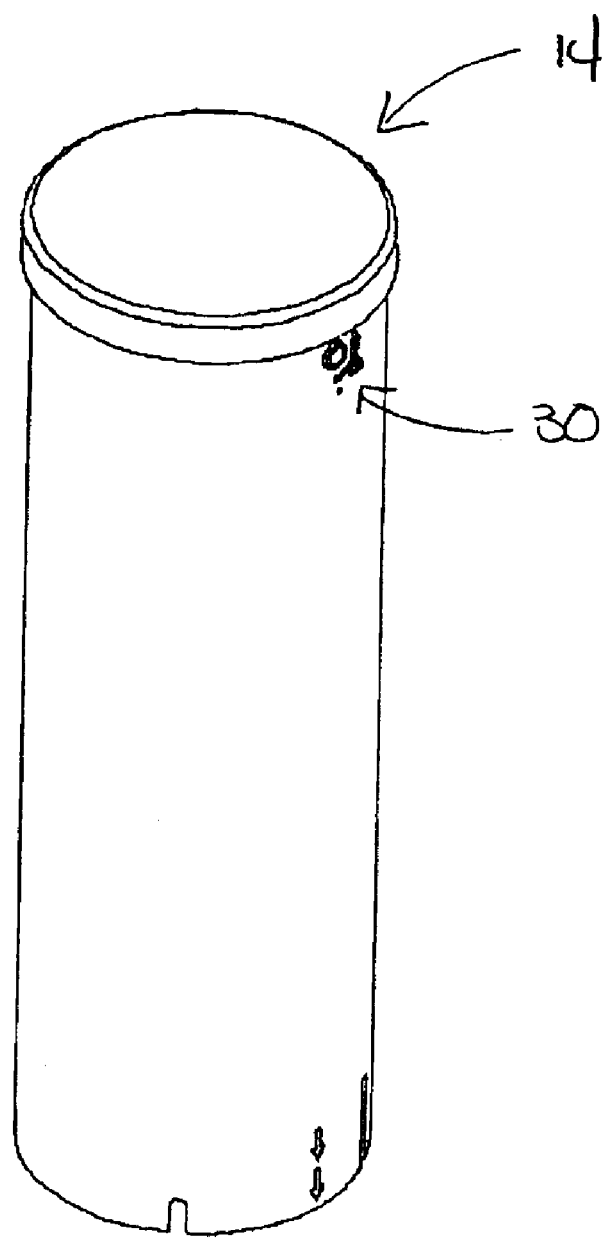
FIG. 8 is a perspective view of an alternative cover for a pedestal enclosure having a lock mechanism according to the invention arranged near the top of the cover.
Figure 9:
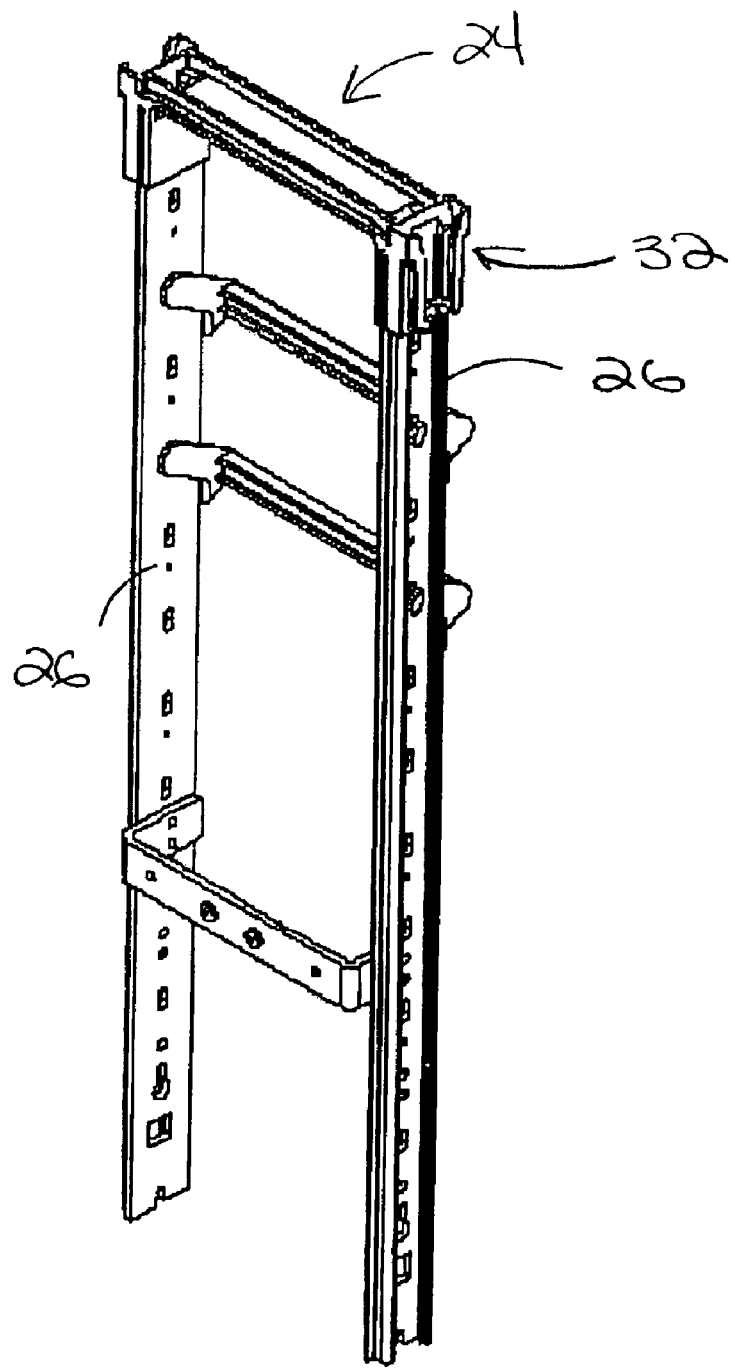
FIG. 9 is a perspective view of a bracket system having a lock receptacle for use in a pedestal enclosure having the cover of FIG. 8.

Due to its relatively simple construction, the locking system 28 can be provided in a variety of different locations on the pedestal enclosure 10. As explained above, in the embodiment illustrated in FIGS. 6 and 7, the locking system 28 is arranged near the bottom of the pedestal enclosure 10 when the cover 14 is installed on the base section 12. This lower location for the locking system 28 enables the cover 14 to maintain a bell jar effect that provides the contents of the pedestal enclosure 10 additional protection against rising floodwaters. Alternatively, the locking system 28 could be arranged near the top of the pedestal enclosure 10 where it would be more accessible to technicians in the field. More specifically, as shown in FIGS. 8 and 9, the lock mechanism 30 could be arranged near the top of the cover 14 and the lock receptacle 32, in turn, could be arranged near the top of one of the side legs 26 of the bracket system 24 supported on the base section 12. Of course, the lock receptacle 32 could be arranged on any other structure in the pedestal enclosure 10 that was connected, directly or indirectly, to the base section 12. In either the top or the bottom location, the lock receptacle 32 could comprise a separate part that is fastened to the bracket system 24 or base section 12 or the lock receptacle 32 could be molded or formed right into the part. Moreover, the lock receptacle 32 could be constructed of any suitable material including metal or plastic.

From the foregoing, those skilled in the art will appreciate that the present invention provides a locking system for a pedestal enclosure that is easy for technicians to operate. Moreover, the locking system allows damaged rotator heads to be replaced in the field and the rotator heads to be easily changed over to heads having a different style if desired. The locking system also is flexible with regard to where it can be arranged on the pedestal enclosure.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pedestal enclosure for electronic components, the enclosure comprising:

a base section;

a cover engageable with the base section;

a lock mechanism arranged on the cover, the lock mechanism including a latch supported in a lock housing for movement between locked and unlocked positions and a rotator rotatably supported by the lock housing such that rotation of the rotator moves the latch between the locked and unlocked positions, the rotator extending through the lock housing and having a head arranged outside a first side of the housing and a shaft end arranged outside a second side of the lock housing, a removable retaining device being arranged on the shaft end outside the second side of the lock housing; and a lock receptacle supported by the base section for receiving the lock mechanism when the cover is engaged with the base section, the lock receptacle including a catch which engages the latch when the latch is in the locked position and prevents disengagement of the cover from the base section.

2. The pedestal enclosure of claim 1 wherein the lock receptacle defines a pocket including surfaces for supporting a front, rear and opposing lateral sides and a lower edge of the lock housing.

3. The pedestal enclosure of claim 2 wherein the lock receptacle includes a pair of side rails defining channels for receiving the lateral sides of the lock housing.

4. The pedestal enclosure of claim 1 wherein the lock mechanism is located near an upper end of the cover.

5. The pedestal enclosure of claim 4 wherein the lock receptacle is arranged on a bracket connected to the base section and arranged in an interior space defined by the base section and the cover.

6. The pedestal enclosure of claim 1 wherein the lock mechanism is located near a lower end of the cover.

7. The pedestal enclosure of claim 6 wherein the lock receptacle is arranged on the base section.

8. The pedestal enclosure of claim 1 wherein the rotator and latch are made of metal.

9. The pedestal enclosure of claim 1 wherein the retaining device is a snap ring.

10. A pedestal enclosure for electronic components, the enclosure comprising:

a base section;

a cover engageable with the base section;

a lock mechanism arranged on the cover, the lock mechanism including a latch supported in a lock housing for movement between locked and unlocked positions and a rotator rotatably supported by the lock housing such that rotation of the rotator moves the latch between the locked and unlocked positions, the lock housing having front, rear and opposing lateral sides and a lower edge; and a lock receptacle supported by the base section for receiving the lock mechanism when the cover is engaged with the base section, the lock receptacle including a catch which engages the latch when the latch is in the locked position and prevents disengagement of the cover from the base section, the lock receptacle defining a pocket including surfaces for supporting the front, rear and opposing lateral sides and the lower edge of the lock housing.

11. The pedestal enclosure of claim 10 wherein the rotator is supported on the housing such that the rotator can be removed from the housing without opening the housing.

12. The pedestal enclosure of claim 10 wherein the lock receptacle includes a pair of side rails defining channels for receiving the lateral sides of the lock housing.

13. The pedestal enclosure of claim 10 wherein the lock mechanism is located near an upper end of the cover.

14. The pedestal enclosure of claim 13 wherein the lock receptacle is arranged on a bracket connected to the base section and arranged in an interior space defined by the base section and the cover.

15. The pedestal enclosure of claim 10 wherein the lock mechanism is located near a lower end of the cover.

16. The pedestal enclosure of claim 15 wherein the lock receptacle is arranged on the base section.

17. The pedestal enclosure of claim 10 wherein the rotator and latch are made of metal.

18. A locking system for securing a base section and a cover of a pedestal enclosure, the locking system comprising:

a lock mechanism arranged on the cover, the lock mechanism including a latch supported in a lock housing for movement between locked and unlocked positions and a rotator rotatably supported by the lock housing such that rotation of the rotator moves the latch between the locked and unlocked positions, the rotator extending through the lock housing and having a head arranged outside a first side of the housing and a shaft end arranged outside a second side of the lock housing, a removable retaining device being arranged on the shaft end outside the second side of the lock housing; and a lock receptacle supported by the base section for receiving the lock mechanism when the cover is engaged with the base section, the lock receptacle including a catch which engages the latch when the latch is in the locked position and prevents disengagement of the cover from the base section.

19. The locking system of claim 18 wherein the lock receptacle defines a pocket including surfaces for supporting a front, rear and opposing lateral sides and a lower edge of the lock housing.

20. The locking system of claim 19 wherein the lock receptacle includes a pair of side rails defining channels for receiving the lateral sides of the lock housing.

21. The locking system of claim 18 wherein the rotator and latch are made of metal.

22. The locking system of claim 18 wherein the retaining device is a snap ring.

23. A locking system for securing a base section and a cover of a pedestal enclosure, the locking system comprising:

a lock mechanism arranged on the cover, the lock mechanism including a latch supported in a lock housing for movement between locked and unlocked positions and a rotator rotatably supported by the lock housing such that rotation of the rotator moves the latch between the locked and unlocked positions, the lock housing having front, rear and opposing lateral sides and a lower edge; and a lock receptacle supported by the base section for receiving the lock mechanism when the cover is engaged with the base section, the lock receptacle including a catch which engages the latch when the latch is in the locked position and prevents disengagement of the cover from the base station, the lock receptacle defining a pocket including surfaces for supporting the front, rear and opposing lateral sides and the lower edge of the lock housing.

24. The locking system of claim 23 wherein the rotator is supported on the housing such that the rotator can be removed from the housing without opening the housing.

25. The locking system of claim 23 wherein the lock receptacle includes a pair of side rails defining channels for receiving the lateral sides of the lock housing.

26. The locking system of claim 23 wherein the rotator and latch are made of metal.

* * * * *